(12) United States Patent
Vagelos

(10) Patent No.: US 10,187,244 B2
(45) Date of Patent: Jan. 22, 2019

(54) USER SELECTABLE OPTIMIZATION OF DATA TRANSMISSION COMPRESSION FOR ELECTRONIC DEVICES

(71) Applicant: TracFone Wireless, Inc., Miami, FL (US)

(72) Inventor: Theodore Vagelos, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 50 days.

(21) Appl. No.: 15/380,024

(22) Filed: Dec. 15, 2016

(65) Prior Publication Data

US 2017/0171775 A1 Jun. 15, 2017

Related U.S. Application Data

(60) Provisional application No. 62/267,549, filed on Dec. 15, 2015.

(51) Int. Cl.
*H04L 29/06* (2006.01)
(52) U.S. Cl.
CPC .......... *H04L 29/0604* (2013.01); *H04L 67/42* (2013.01); *H04L 69/04* (2013.01)

(58) Field of Classification Search
CPC ..... H04L 29/0604; H04L 69/04; H04L 29/06; H03M 7/30; H04W 28/06
USPC .................................................. 370/464, 477
See application file for complete search history.

(56) References Cited

U.S. PATENT DOCUMENTS

| | | | |
|---|---|---|---|
| 8,949,466 B1* | 2/2015 | Crosbie | H04W 4/70 709/247 |
| 2014/0351229 A1* | 11/2014 | Gupta | G06F 17/30153 707/693 |
| 2016/0286544 A1* | 9/2016 | Ikeda | H04W 72/048 |
| 2016/0344646 A1* | 11/2016 | Wang | H04L 47/38 |

* cited by examiner

*Primary Examiner* — Obaidul Huq
(74) *Attorney, Agent, or Firm* — Baker & Hostetler LLP

(57) ABSTRACT

A process for modifying wireless data compression for a wireless electronic device includes displaying an application for modifying data compression on a display of the electronic device. The process further includes receiving a request from a user to modify a current data compression with a new data compression through an input device, evaluating the requested new data compression request in view of predetermined information of the user with a processor, and updating the wireless data compression with the new data compression after the evaluation with the processor.

20 Claims, 7 Drawing Sheets

USER SELECTABLE OPTIMIZATION OF DATA TRANSMISSION COMPRESSION FOR ELECTRONIC DEVICES

CROSS REFERENCE TO PRIOR APPLICATIONS

This application claims the benefit from U.S. Provisional Application No. 62/267,549 filed on Dec. 15, 2015, which is hereby incorporated by reference for all purposes as if fully set forth herein.

BACKGROUND OF THE DISCLOSURE

1. Field of the Disclosure

This disclosure generally relates to methods, systems, and software applications for modifying wireless data transmission compression on electronic devices. More particularly, this application relates to methods, systems, and software applications for improving user experience on an electronic device as it relates to data transmission compression.

2. Related Art

Electronic devices, such as, for example, a wireless cell phone, typically allow users to utilize their electronic devices to have wireless service based on a monthly plan. Once the monthly plan is provisioned, an end user is able to talk, text, web browse, email, access data services, and the like. Similarly, Pre-paid electronic devices, such as, for example, a pre-paid wireless cell phone, typically allow users to utilize their electronic devices and add wireless service. Once the wireless service is provisioned, an end user is able to talk, text, web browse, email, access data services, and the like.

However, wireless service carriers limit the amount of high speed internet data that customers can consume during a predetermined billing period (e.g., monthly billing plan) and after reaching a limit (which may vary by rate plan), the carriers either: throttle the data speed until the end of the billing period, or block all data until the end of the billing period.

A need exists in the art for systems, methods and software applications for providing data compression on a wireless network for an activated electronic device to a allow user greater data usage flexibility.

SUMMARY OF THE DISCLOSURE

One aspect of the disclosure includes a process for modifying wireless data compression for a wireless electronic device that includes displaying an application for modifying data compression on a display of the electronic device, receiving a request from a user to modify a current data compression with a new data compression through an input device, evaluating the requested new data compression request in view of predetermined information of the user with a processor, and updating the wireless data compression with the new data compression after the evaluation with the processor.

Another aspect of the disclosure includes a wireless electronic device configured for modifying wireless data compression that includes a display configured to display an application for modifying data compression on the display of the electronic device, an input device configured to receive a request from a user to modify a current data compression with a new data compression, a processor configured to evaluate the requested new data compression request in view of predetermined information of the user, and a transceiver configured to inform a wireless network regarding the wireless data compression with the new data compression after the evaluation.

Another aspect of the disclosure includes a non-transitory computer readable storage medium storing computer-readable instructions for a software application for modifying data compression, which when executed on a processor, causes an electronic device to perform the following instructions for displaying an application for modifying the data compression on a display of the electronic device, instructions for receiving a request from a user to modify a current data compression with a new data compression, instructions for evaluating the requested new data compression request in view of predetermined information of the user, and instructions for updating the wireless data service with the new data compression after the evaluation.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

In order to facilitate a fuller understanding of the disclosure, reference is now made to the accompanying drawings, in which like elements are referenced with like numerals. These drawings should not be construed as limiting the disclosure and intended only to be illustrative.

DETAILED DESCRIPTION

Figure 1:
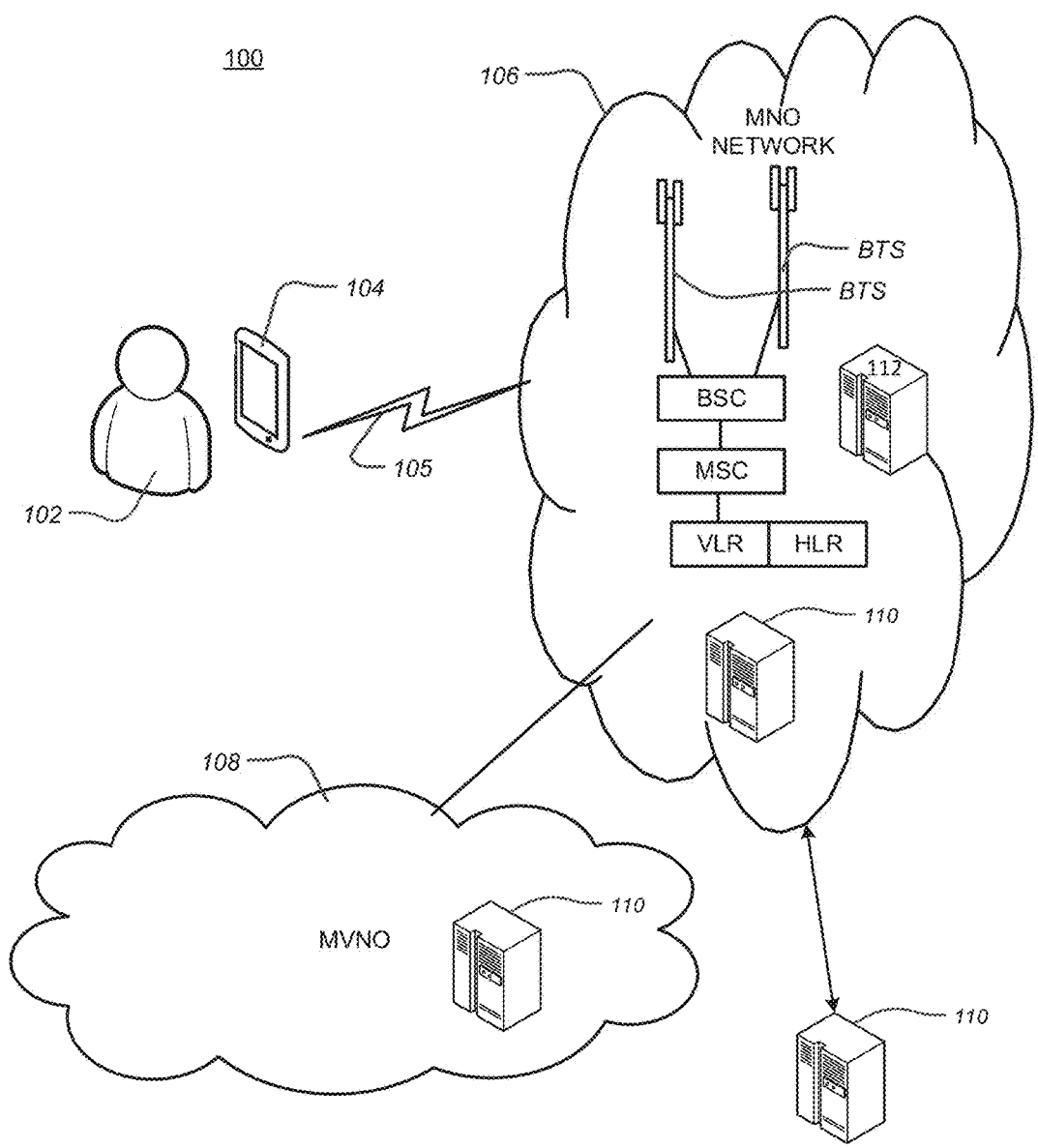
FIG. 1 illustrates a schematic diagram of an exemplary electronic device and wireless system in accordance with an aspect of the disclosure.

In this regard, the disclosure provides technology to optimize or compress data transmission. Such technology may allow a user to consume less data for the same activities. However, a user seeking to use a typical data service must generally comport to the fixed and rigid data service rate provided by the network operator. Different compression rates are typically not available when choosing a service (data compression ranging from a low compression rate to a high compression rate). For example, a user of an electronic device watching video, may want a lower data compression rate so that the video is more clear. On the other hand, the user checking and responding to e-mail over the Internet, may preferably select a higher data compression rate as this type of activity typically does not greatly impact such services. A user typically does not have the ability to adjust the data compression rate. This is a drawback to many end users desiring greater control and access to a cellular data network.

As an initial matter, reference in this specification to "one aspect," "an aspect," "one or more aspects," or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not by other aspects.

User satisfaction is an important factor that wireless service providers consider in order to be competitive in the market. In this regard, there are some users who prefer to change their data package in view of immediate needs only for a short duration. That is, low data compression (e.g., for video streaming, audio streaming, and the like) when they want it and high data compression for the remainder of the time.

One aspect of the disclosure is to provide a system and method designed for upgrading and/or downgrading data compression on an activated electronic device. Another aspect of the disclosure is to provide a system and method allowing users to adjust the length of time for a certain compression of data on an electronic device is implemented.

It is to be understood that the system modules and method steps described in this application may be employed in various forms of hardware, software, firmware, special purpose processors or a combination thereof. The application preferably is directed to a process and system utilizing a software application comprising executable code that is operably stored on one or more program storage devices including but not limited to a magnetic floppy disk, RAM, ROM, CD ROM, SIM, UICC, Flash memory or the like.

Reference in this specification to an electronic device 104 is intended to encompass devices such as mobile phones, tablet computers, gaming systems, MP3 players and the like. Reference to an "electronic device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "electronic device" may be interchangeably used and referred to herein as wireless handset, handset, mobile device, device, mobile phones, mobile equipment, mobile station, user equipment, cellular phone, smartphones, or phone.

An electronic device 104, such as, for example, a mobile phone, access networks via service providers. Some companies provide postpaid wireless services. These providers can be wireless carriers or Mobile Network Operators (MNO) that maintain and control their own wireless networks. An MNO relies heavily on backend systems to address any provisioning, billing, security and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks, minutes of use, volume of data transfer, number of SMS messages, etc. Such services may then be sold to end users, e.g., subscribers. Implementation of the disclosure is equally applicable to a MNO only network or a MVNO network used in conjunction with a MNO network. However, for brevity, the disclosure will describe an implementation utilizing a MVNO network used in conjunction with a MNO network.

In aspects including a "wireless network", the network may encompass any type of wireless network including a Mobile Network Operator (MNO) or a Mobile Virtual Network Operator (MVNO) to provide mobile phone services through the use of an electronic device, on a communication channel as defined herein, that may utilize the teachings of the disclosure to allow an electronic device 104 to connect to a wireless network 106.

FIG. 1 illustrates a system 100, according to one or more aspects of the present disclosure. The system 100 may be used to provide services on an electronic device 104. A user 102 enters the appropriate actions into the electronic device 104. For example, the user may enter an action to update data compression services on the electronic device 104. The actions may include, for example, powering on the already activated electronic device 104; selecting the data compression service application implemented on the electronic device 104 home screen 300 (shown in FIG. 3) or navigating to the data compression service application via a drop down menu; selecting the change compression service link in the data service application main screen 350 (shown in FIG. 3); and then following the change data compression instructions displayed on the subsequent screen 400 (shown in FIG. 4) to complete the data compression service update. The electronic device 104 communicates over a channel 105 with a wireless network 106 for use in updating services on the electronic device 104.

In one aspect, the channel 105 may be a broadband communication channel as defined herein such as LTE, G, and the like. In other aspect, the channel 105 may be a communication channel as defined herein such as Wireless Fidelity (Wi-Fi). In another aspect, the channel 105 may be a data messaging channel. For example, the data messaging channel may include, but is not limited to, an Unstructured Supplementary Service Data (USSD) channel, a Short Message Service (SMS) messaging channel, a Wireless Application Protocol (WAP) messaging channel, or the like.

In an exemplary aspect, the wireless network 106 receives the message from the electronic device 104 via the channel 105. The channel forwards the message in real-time to a server 110 for the updating of data compression services for the electronic device 104. In one or more aspects, the server 110 may be any server designed to send/receive, hold, and update information about the wireless services for the electronic device 104. The server 110 may be part of the MNO wireless network 106, part of a MVNO network 108, and/or separate from the wireless network 106 and MVNO network 108 (as illustrated in FIG. 1, with multiple servers 110, although only one server 110 is needed or would typically be utilized). The wireless network 106 may include a base transceiver station BTS, a base station controller BSC, a mobile switching center MSC, visitor location register VLR, home location register HLR, and the like. Other types of wireless networks utilizing a communication channel as defined herein are contemplated as well.

The wireless network 106 may further include a processor 112 for compressing data prior to transmission. For example, the processor 112 may be a codec. The processor 112 may utilize any compression standard. For example, the compression standard H.263 developed by the ITU-T Video Coding Experts Group (VCEG) may be utilized. Alternatively or additionally, the compression may involve Video optimization, including lossless and lossy techniques, dynamic bandwidth shaping (DBS), JIT delivery methods, lossless optimization applied and metered based on available bandwidth, Web optimization, and TCP optimization that supports higher file transfer rates so content is delivered faster. Of course any other current or future compression standard may be utilized.

The processor 214 of the electronic device 104 may be configured for decompressing data at reception consistent with the compression process noted above. For example, the processor 214 may include a codec. Of course any other current or future decompression devices or standards may be utilized. Additionally, the electronic device 104 may be implemented with no decompression device.

Figure 2:
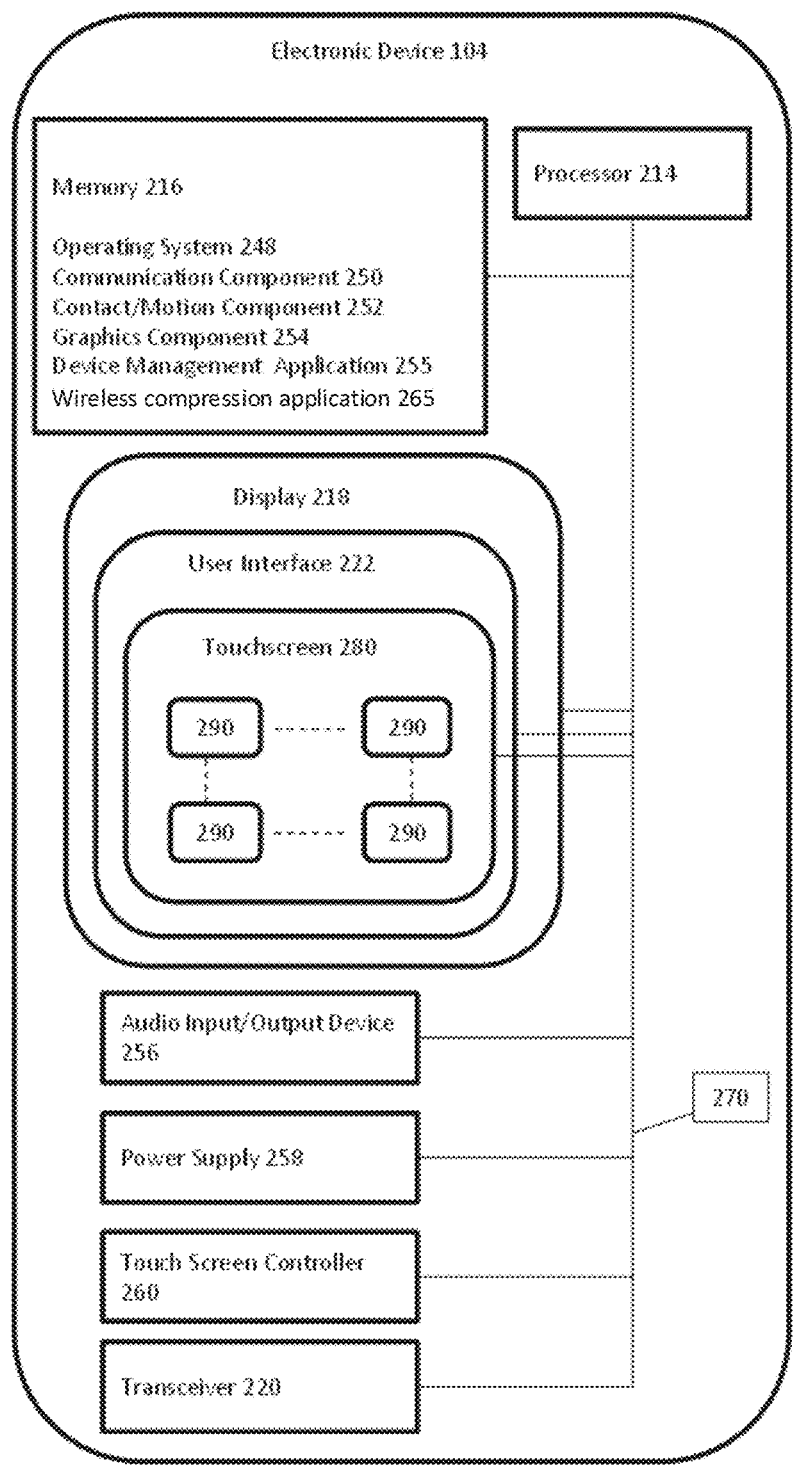
FIG. 2 illustrates an exemplary electronic device in accordance with an aspect of the disclosure.

FIG. 2 illustrates an exemplary electronic device 104, such as, for example, a mobile smart phone which may be employed in many aspects of this application. In an exemplary aspect, the electronic device 104 includes a processor 214, memory 216, display 218, a power supply 258, touch screen controller 260, and a user interface 222.

The processor 214 may be a central processing unit configured to execute instructions, such as, for example, instructions related to software programs. Any processor can be used for the electronic device 104 as understood to those of ordinary skill in the art. The display 218 may be a liquid crystal display (LCD). Preferably the LCD includes a backlight to illuminate the various color liquid crystals to provide a more colorful display. The user interface 222 may be any type of physical input as readily employed in the field. For example, the user interface may have physical buttons. Alternatively, the user interface may be implemented on a touchscreen 280 having a touchscreen controller.

The memory 216 of the electronic device 104 may further include an operating system 248, a communication component 250, a contact/motion component 252, a graphics component 254, device management application 255 and the like. The operating system 248 together with the various components provides software functionality for each of the components of the electronic device 104. The memory 216 may include a high-speed, random-access memory. Also, the memory 216 may be a non-volatile memory, such as magnetic fixed disk storage, flash memory, UICC, SIM card, or the like. These various components may be connected through various communication lines including a data bus 270.

Additionally, the electronic device 104 may include an audio input/output device 256. The audio input/output device 256 may include speakers, speaker outputs, and the like, providing sound output; and may include microphones, microphone inputs, and the like, for receiving sound inputs. The audio input/output device 256 may include an analog to digital converter and a digital to audio converter for audio input and output functions respectively.

When implemented as a wireless device, the electronic device 104 may include a transceiver 220. The electronic device 104 may provide radio and signal processing as needed to access a network for services. The processor 214 may be configured to process call functions, data transfer, and the like and provide other services to the user.

In an exemplary aspect, the touchscreen 280 of the disclosure may be implemented in the display 218 and may detect a presence and location of a touch of a user within the display area. For example, touching the display 218 of the electronic device 104 with a finger or hand. The touchscreen 280 may also sense other passive objects, such as a stylus.

In operation, the display 218 may show various objects 290 associated with applications for execution by the processor 214. For example, a user may touch the display 218, particularly the touchscreen 280, to interact with the objects 290. That is, touching an object 290 may execute an application in the processor 214 associated with the object 290 that is stored in memory 216. Additionally or alternatively, touching an object 290 may open a menu of options to be selected by the user. The display 218 may include a plurality of objects 290 for the user to interact with. Moreover the display 218 may include a plurality of screens. The display 218 showing one screen at a time. The user may interact with the display 218 to move a screen into view on the display 218. Various objects 290 may be located in each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 218 is generally configured to display a graphical user interface (GUI) that provides an easy to use visual interface between a user of the electronic device 104 and the operating system or application(s) running on the electronic device 104. Generally, the GUI presents programs, files and operational options with graphical images. During operation, the user may select and activate various graphical images displayed on the display 218 in order to initiate functions and tasks associated therewith.

In another aspect of the disclosure, the memory 216 of an electronic device 104 includes a database for storing user information. The user information is exemplary, and may include further information as required by the service provider and may include information such as full name, address, date of birth, email address, contact number, credit card information, and the like. In one aspect, the database may include security questions. In another aspect, the database may include user specified preferences.

In another aspect of the application, the memory 216 of an electronic device 104 includes a wireless service compression software application 265. This application 265 allows the user to manage settings and functions of the wireless service compression utilized in conjunction with the wireless service on their electronic device 104.

In a further exemplary aspect, predetermined information regarding the user may be stored and available for the application to review and use to determine whether to change the user's current service. For example, predetermined information of the user may include, but is not limited to, available remaining minutes, tracking information on user minutes used for different time periods, current data compression rate, time stamps for any future/already purchased data service modifications, credit/debit card and PayPal information, security profile, user-approved billing requests, security questions, and combinations thereof.

Preferably, the electronic device 104 is a hand-held device. The hand-held device may include but is not limited to laptop devices, tablets, PDAs and smartphones.

Figure 3:
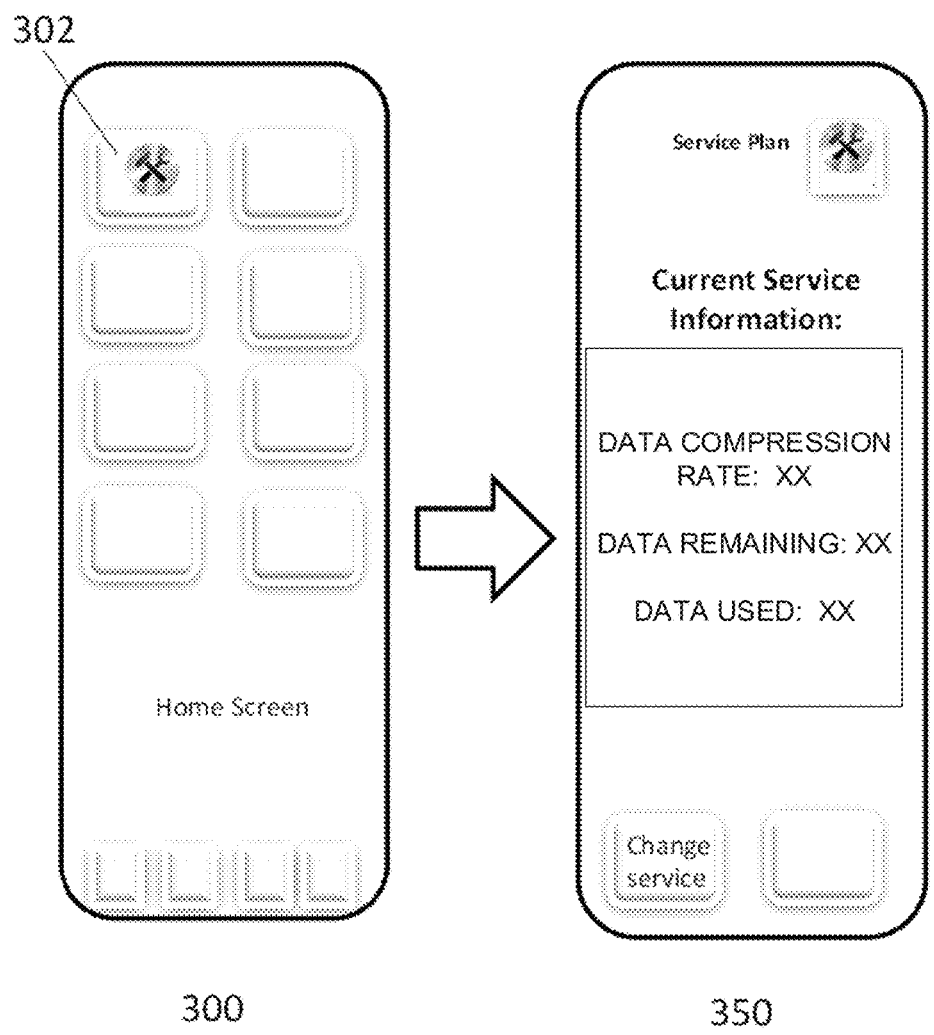
FIG. 3 illustrates exemplary electronic device displays providing data compression options for the electronic device in accordance with an aspect of the disclosure.

According to yet another exemplary aspect as illustrated in FIG. 3, the electronic device 104 includes a home screen 300 including one or more applications. The home screen may include but is not limited to a calling icon, texting icon, and Internet icon and the like allowing a user to perform one or more functions on the electronic device 104. The home screen may also display icons for one or more applications that have been downloaded from the Internet, or retrieved from a store, such as the Play or Apple store. In particular, one of the applications (displayed via an application icon 302), upon being launched, allows users to modify their wireless compression services on an activated electronic device 104.

A launched application is shown on a secondary screen 350 in FIG. 3. The user interface screen 350 displays service information of the application. The application, for example, allows a user to view their current service information. The current service information may include but is not limited to their data compression rate, data usage, and remaining data left in association with the wireless service. The functionalities available to the user via the graphical user interface on screen 350 will be discussed below in more detail.

Figure 4:
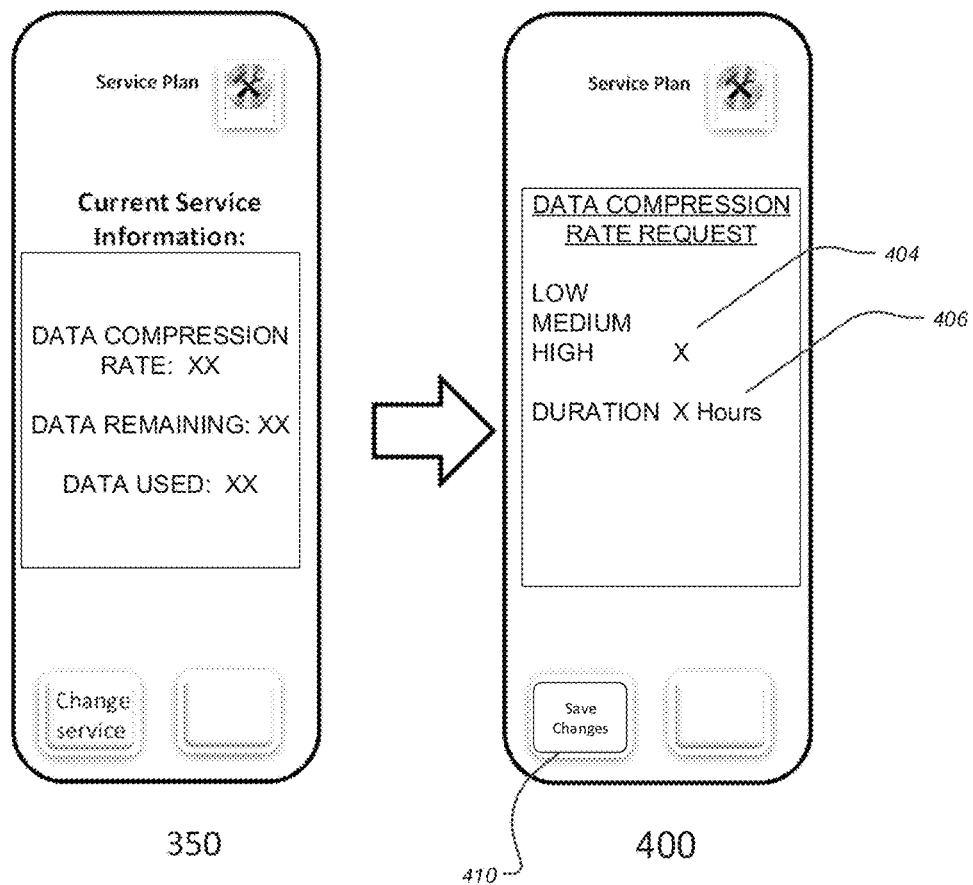
FIG. 4 illustrates other exemplary electronic device displays providing data compression service options for the electronic device services in accordance with an aspect of the disclosure.

In an exemplary aspect, the user is permitted to select and change data compression services on the electronic device 104. FIG. 4 illustrates an exemplary display 400 allowing for such modification. The application on the electronic device 104 may prompt the user to enter or select information regarding modifying the data compression rate.

In one or more aspects, the data compression application will have different data compression rates available to choose from when activating or modifying the service for the device. Some of the data compression rates available for selection may include but are not limited to a low, medium, or high data compression rates. For example, if the user 102 of the electronic device 104 wishes to use the electronic device 104 to send and receive text messages, the user 102 may opt to select a high compression rate (low data quality service rate). Now, if the user during the middle of his or her service wishes to watch an event, such as for example, a video, benefiting from high data quality data service (for example viewing a video on a larger display), the user 102, may wish to change his data service from high compression rate (low quality data service rate) to a low compression rate (high quality data service rate). The application allows the user to change the compression rate contingent upon their present needs. That is, the higher the data compression, the more data that is available to the user. Meanwhile, the lower the data compression, the less data is available to the user.

In one or more aspects, the data compression service application may allow the user 102 of the electronic device 104 to select the length for which the new compression rate should last. In one aspect, the selected length may be fixed. The length may be selected from a drop-down list, i.e., X hours, 1 day, 5 days, 20 days, etc. Once the user enters a length of time, the compression rate, and submits the change 410, the data compression rate will be updated in screen 350. After the length of time has expired, the data compression rate returns to the prior data compression rate.

Alternatively, the selected length may be variable. The latter aspect may be helpful when a live event is broadcast and the finish time is unpredictable in view of for example, over-time in sporting events. For example, in a football game, if the user 102 desires to modify his data compression rate to employ the high data quality service rate for the duration of the football game and any over-time, the user 102 can select a single event and the prior data compression rate will return after the single event has been completed. For example, opening a browser, a video streaming application or the like may trigger the start of the event; and closing a browser, a video streaming application or the like may trigger the end of the event. The user therefore does not have to wait until the end of the month and unnecessarily waste data services after the football game.

In another exemplary aspect, data compression may be selected from a fixed list, e.g., low, medium, high data compression. Once the user enters the compression rate and submits the change 410, the data compression rate will be updated in screen 350.

Alternatively, the data compression rate may be selected from a variable list, e.g., sliding scale of data compression. This approach may be appropriate in circumstances when the user is aware of the specific data compression they require for a service. By so doing, the user does not have to waste more data for what they desire and retains the maximum available amount of data.

Selecting to modify the data compression can be done in multiple ways. Selecting may include, but is not limited to, selecting the length of time 406 of a particular data compression rate by selecting a particular data compression rate via a pull down menu 404; manually entering the length of time 406 of a particular data compression rate, or manually entering a data compression rate. The selection can include dragging and clicking one of plural markers depicting different lengths of time which can be increased or decreased.

Figure 5:
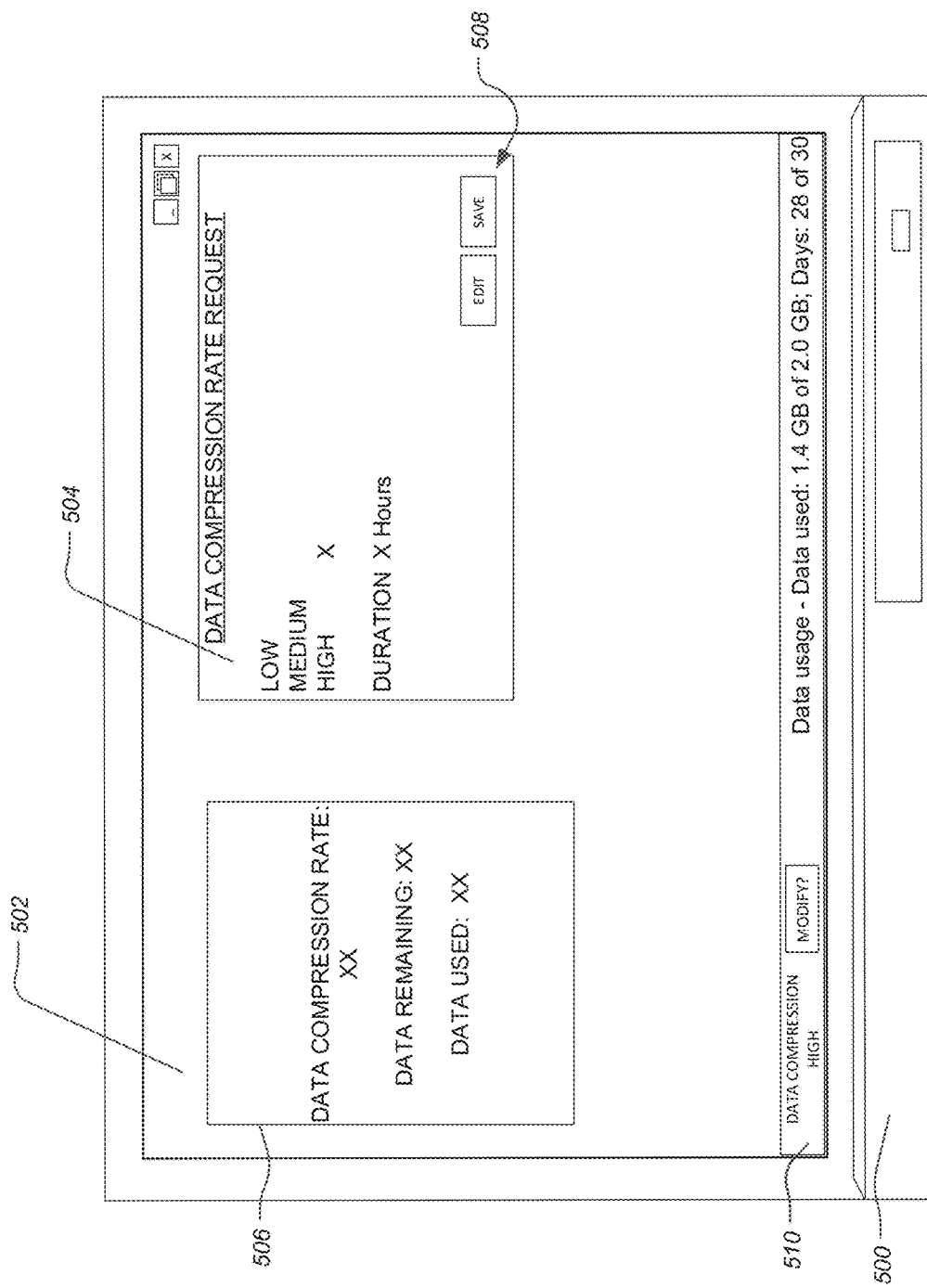
FIG. 5 illustrates an exemplary electronic device providing data compression service options in accordance with an aspect of the disclosure.

FIG. 5 illustrates an exemplary electronic device providing data compression service options in accordance with an aspect of the disclosure. In this regard, instead of or additionally the user of the electronic device 104 may modify the data compression rate utilizing a separate electronic device 500. The separate electronic device 500 may be a laptop, PC, or other Internet enabled device having web browsing capabilities and a display 502. The user 102 may access an account associated with the wireless service provider. The web-based account may allow a user to view their current service information 506. The current service information 506 may include, but is not limited to, their data compression rate, data usage, and remaining data left in association with the wireless service. Alternatively or additionally, a dashboard 510 may provide similar information. In an exemplary aspect, the user is permitted to select and change data compression services 504. The web-based account may prompt the user to enter or select information regarding modifying the data compression rate.

In one or more aspects, the web-based account may have different data compression rates available to choose from when activating or modifying the service for the device. Some of the data compression rates available for selection may include but are not limited to a low, medium, or high data compression rates. In one or more aspects, the data compression service web-based account will allow the user 102 of the electronic device 104 to select the length for which the new compression rate should last. In one aspect, the selected length may be fixed. The length may be selected from a drop-down list, i.e., X hours, 1 day, 5 days, 20 days, etc. Once the user enters a length of time, the compression rate and submits the change 508, the data compression rate will be updated in screen 506. After the length of time has expired, the data compression rate returns to the prior data compression rate. Alternatively, the selected length may be variable as described above.

Alternatively or additionally, the user 102 may be able to change the compression rate in a manner similar to the application 302 or the web-based account shown in FIG. 5 through an interactive voice response system. The interactive voice response system may require the user identify the electronic device 104, authenticate that they are the user 102 of the electronic device 104, and thereafter allow for modification of the data compression implemented by the wireless network.

Figure 6:
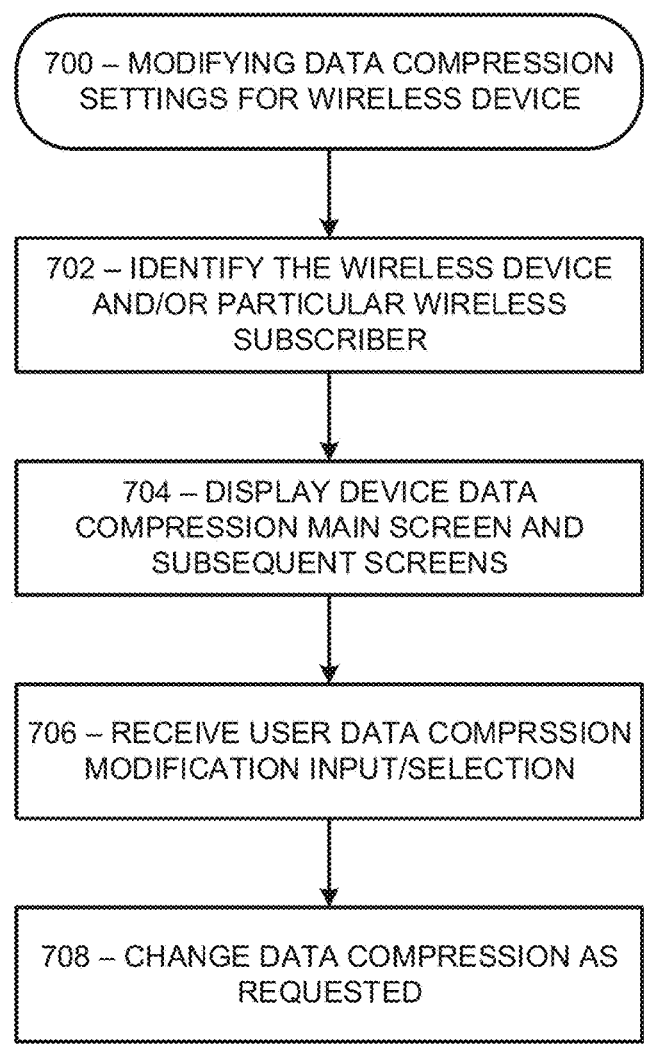
FIG. 6 illustrates an exemplary process for modifying the data compression service on the activated electronic device.

As illustrated in FIG. 6, an exemplary hierarchy chart is provided showing application software 700 employed for modifying the data compression on an activated electronic device 104. Box 702 illustrates instructions whereby the device data compression application identifies the electronic device 104 and the user 102. When the application is launched, the application pulls or updates information about the electronic device 104 and subscriber from the memory and/or the server 110. This information may be stored in the memory upon initial activation of the electronic device 104, and may be periodically updated by the electronic device 104 which is configured to send and receive service status requests and messages to and from the wireless network 106 via the channel 105.

Box 704 illustrates instructions whereby the device data compression application's main screen and subsequent screens are displayed on a display of the electronic device 104 for user review. The data compression application main screen displays service information and allows a user to view, update, or the like. If the user 102 selects the change compression link at the bottom of the main screen, a subsequent screen appears prompting the user to enter or select the preferences regarding the desired data compression changes the user would like to apply, such as, for example but without limitation, data compression rate, length of service, or a combination thereof.

Box 706 illustrates receipt of the user's selection regarding the data compression they would like to utilize. Again, the user may select to change for example, but without limitation, data compression, length of service, or a combination thereof. And again, making a selection may be done, but is not limited to, a variety of ways: in one aspect the selection may be selected via a pull down menu; in another aspect the user may be prompted to manually enter the selection; in yet another aspect the user may be prompted to make a selection by selecting one of a variety of links depicting the different options.

Box 708 illustrates instructions whereby the new data compression requested by the user is applied. In one or more aspects, the information regarding the update can be sent by the electronic device in one or more ways including but not limited to, a text message, a separate pop up window, navigation to a subsequent screen, an email sent to the user's account, a prompt to enter an email address or text to send the update information to, or the like. In a further exemplary aspect, the prompt could contain a message similar to "Your account has been updated," and then a list of the current service information below that. It should be appreciated that one or more portions of the process 700 may be implemented by the server 110, the wireless network 106, and/or the MVNO network 108.

Figure 7:
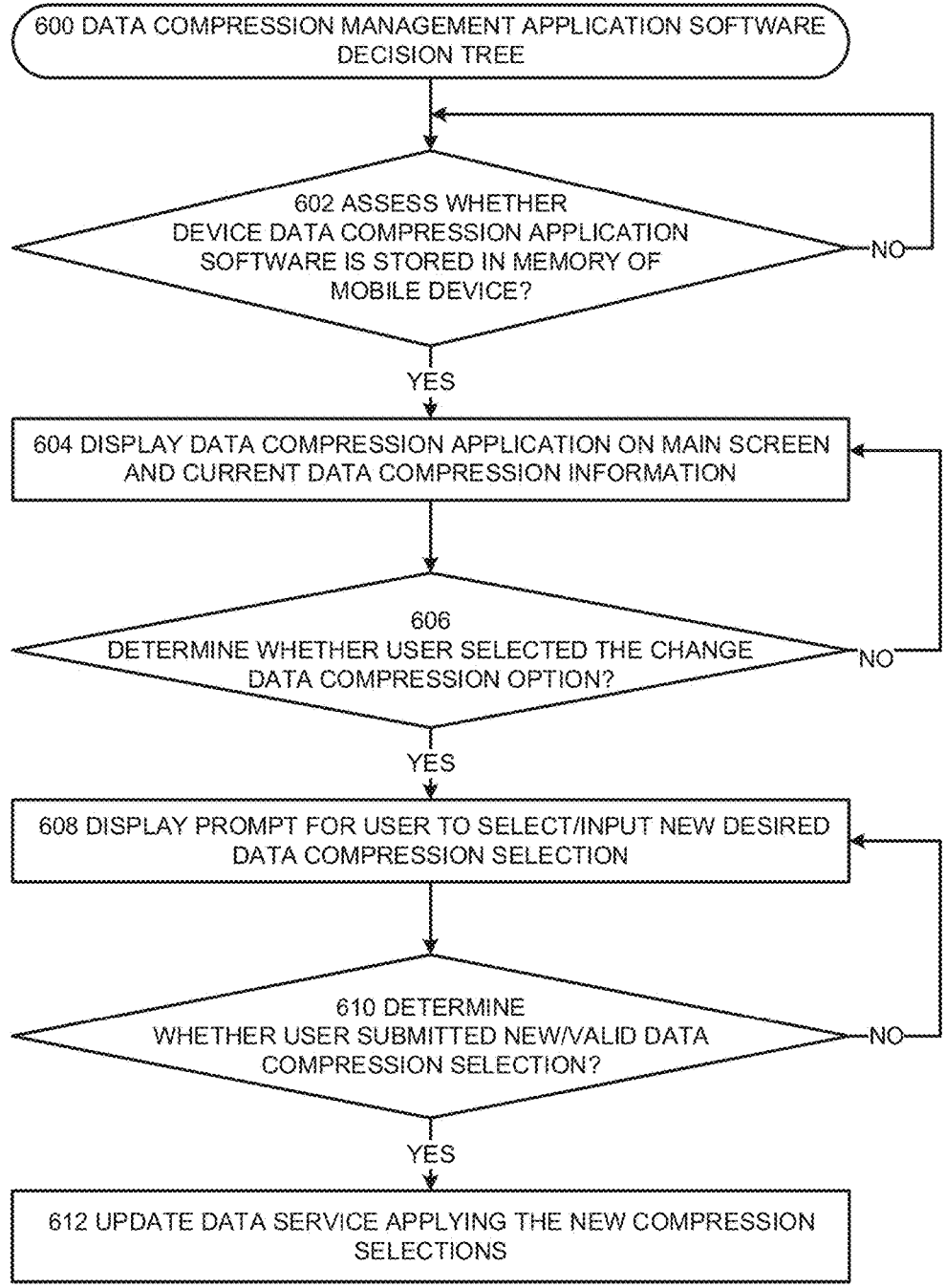
FIG. 7 is a decision tree illustrating the process of the master application.

FIG. 7 illustrates a decision tree 600 for the process of the master application. The first decision box 602 of the process assesses whether the software is located and stored in the memory of the device. According to box 604, if the software program concludes in the affirmative, the data compression application along with the subsequent screens is configured to be displayed on the display screen. The initial screen may include a shortcut application for the device management application. Alternatively, the application may be located under the applications tab. In an exemplary aspect, the subsequent screen directly follows the initial screen which displays the device management application.

On the other hand, if the software program concludes in the negative, the process is returned to box 600. At this stage, the application may be required to be installed onto the electronic device 104. In an exemplary aspect, the application is pre-installed on the electronic device 104.

Next, the process queries whether the user has selected to change the data compression in box 606. The user accesses the Change Data Service screen by tapping or executing a hyper-linked toggle button towards the bottom of the Data service Home Screen. If the application process concludes in the affirmative, respective fields are displayed prompting the user to select/input new desired data compression rates according to box 608. On the other hand, if the process concludes in the negative, the process is returned to box 604. In other words, nothing happens, and the application remains on the same screen/the current data compression application home screen. (The flow-process regarding selection of the other possible toggle buttons in the data compression application home screen 350, are not depicted in this flow chart.)

A further step of the process, as illustrated by box 610, queries whether the user has submitted new/valid data compression rate. If the application process concludes in the affirmative, the process moves to box 612. On the other hand, if the process concludes in the negative, the process is returned to box 608, and the user may be prompted again to select/input a new desired data compression selection. Alternatively, if the process concludes in the negative, the application may display a message informing user that the selection was invalid, before returning back to the display stipulated in box 608. Finally, each of the above-noted aspects may transmit the request for the modified data compression the server 110 that may be associated with one or more of the MNO or MVNO, or otherwise associated to work with one or more of the MNO or MVNO.

Accordingly, the disclosure has described technology to optimize or compress data transmission. This technology allows a user to consume less data for the same activities. In this regard, a user of an electronic device watching video, can be provided with a lower data compression rate so that the video is more clear. On the other hand, the user checking and responding to e-mail over the Internet may be provided with a higher data compression rate as this type of activity typically does not greatly impact such services. More specifically, the user has the ability to adjust the data compression rate as desired providing end users greater control and access to a cellular data network.

In an exemplary aspect, the memory element of the system may include but is not limited to a non-transitory memory unit, memory device, memory article, memory medium, storage device, storage article, storage medium and/or storage unit, for example, memory, removable or non-removable media, erasable or non-erasable media, writeable or re-writeable media, digital or analog media, random access memory, flash memory, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

In a further aspect, the system also includes a processor. The processor may be operatively coupled to the memory, e.g., data storage unit. In an exemplary aspect, the processor may execute the data compression application stored on the memory. The processor 214 may be a central processing unit configured to execute instructions including instructions related to software programs. The processor may be configured to process call functions, data transfer, and the like and provide other services to the user.

In an exemplary aspect, the processor may be implemented in any type of mobile smartphone that may be operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

In yet another aspect of the disclosure disclosed in this application is a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. The non-transitory computer-readable or processor-readable medium includes instructions stored thereon for a software program. In an exemplary aspect, the code or instruction of the software program is executable by a processor of the SIM or electronic device 104 in machine readable form.

In one or more aspects, the actions and/or events of a method, algorithm or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

The application may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, 5G (5th generation mobile networks), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™

Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A process for modifying wireless data compression for a wireless electronic device comprising:
   providing an application for modifying wireless data compression that generates a graphical user interface on a display of the wireless electronic device;
   receiving a request from a user to modify a current wireless data compression with a new wireless data compression through an input device;
   evaluating the requested new wireless data compression request in view of predetermined information of the user with a processor;
   updating the wireless data compression with the new wireless data compression after the evaluation with the processor; and
   providing wireless service from a wireless network to the wireless electronic device utilizing the new wireless data compression,
   wherein the request for the new wireless data compression includes a wireless data compression rate and a length of time of the wireless data compression; and
   wherein after the length of time of the wireless data compression has expired, the data compression returns to a prior data compression rate.

2. The process according to claim 1,
   wherein the request for the new wireless data compression comprises a request for the new wireless data compression for a single event; and
   wherein after the single event has been completed, the data compression returns to a prior data compression rate.

3. The process according to claim 1, wherein the application is further configured to display a data compression rate, a data usage, and remaining data left in association with the wireless service on the display of the wireless electronic device.

4. The process according to claim 1, wherein the updating further comprises updating a server associated with a wireless provider.

5. The process according to claim 4, further comprising:
   providing the user with wireless service consistent with the new wireless data compression as instructed by the server.

6. The process according to claim 5, further comprising: instructing a wireless compression device to provide the user with wireless service consistent with the new wireless data compression by the server.

7. The process according to claim 1, further comprising: compressing a wireless service consistent with the new wireless data compression with a wireless compression device.

8. The process according to claim 1, wherein the wireless electronic device is a pre-paid phone with wireless network services provided by a mobile virtual network operator.

9. A wireless electronic device configured for modifying wireless data compression comprising:
   a display configured to display an application for modifying a wireless data compression on the display of the wireless electronic device;
   an input device configured to receive a request from a user to modify a current wireless data compression with a new wireless data compression;
   a processor configured to evaluate the requested new wireless data compression request in view of predetermined information of the user;
   a transceiver configured to transmit to a wireless network a request to modify the wireless data compression with the new wireless data compression after the evaluation, the wireless network thereafter operating to provide wireless service that utilizes the new wireless data compression; and
   the transceiver further configured to utilize the wireless service from the wireless network utilizing the new wireless data compression,
   wherein the request for the new wireless data compression includes a wireless data compression rate and a length of time of the wireless data compression; and
   wherein after the length of time of the wireless data compression has expired, the data compression returns to a prior data compression rate.

10. The device according to claim 9,
    wherein the request for the new wireless data compression comprises a request for the new wireless data compression for a single event; and
    wherein after the single event has been completed, the data compression returns to a prior data compression rate.

11. The device according to claim 9, wherein the application is further configured to display a data compression rate, a data usage, and remaining data left in association with the wireless service on the display of the wireless electronic device.

12. The device according to claim 9, wherein the processor is further configured to decompress wireless data received from the wireless network.

13. The device according to claim 9, wherein the transceiver is further configured to update a server associated with a wireless provider.

14. The device according to claim 9, wherein the transceiver is further configured to decompress a wireless service consistent with the new wireless data compression.

15. The device according to claim 9, wherein the predetermined information is a wireless data compression rate.

16. The device according to claim 9 wherein the device comprises a pre-paid phone with wireless network services provided by a mobile virtual network operator.

17. A non-transitory computer readable storage medium storing computer-readable instructions for a software application for modifying a wireless data compression, which when executed on a processor, causes an electronic device to perform the following:
    instructions for displaying an application for modifying the wireless data compression on a display of the electronic device;
    instructions for receiving a request from a user to modify a current wireless data compression with a new wireless data compression through an input device of the electronic device;

instructions for evaluating the requested new data compression request in view of predetermined information of the user;

instructions for updating a wireless data service with the new wireless data compression after the evaluation; and instructions for providing wireless service from a wireless network to the electronic device utilizing the new wireless data compression, wherein the request for the new wireless data compression includes a wireless data compression rate and a length of time of the wireless data compression; and wherein after the length of time of the wireless data compression has expired, the data compression returns to a prior data compression rate.

18. The non-transitory computer readable storage medium according to claim 17, wherein the request of the new wireless data compression comprises a request for the new wireless data compression for a single event; and wherein after the single event has been completed, the data compression returns to a prior data compression rate.

19. The non-transitory computer readable storage medium according to claim 17, wherein the application is further configured to display a data compression rate, a data usage, and remaining data left in association with the wireless service on the display of the electronic device.

20. The non-transitory computer readable storage medium according to claim 17, further comprising instructions for updating a server associated with a wireless provider.

* * * * *